United States Patent [19]

Ackerman

[11] Patent Number: 5,176,215

[45] Date of Patent: Jan. 5, 1993

[54] COMPOSITE DRAIN PLUG

[75] Inventor: Yuri Ackerman, Chicago, Ill.

[73] Assignee: Chicago Rawhide Manufacturing Co., Elgin, Ill.

[21] Appl. No.: 767,861

[22] Filed: Sep. 30, 1991

[51] Int. Cl.⁵ .............................................. F16N 33/00
[52] U.S. Cl. .................................... 184/1.5; 220/304; 277/180; 277/212 F
[58] Field of Search ................... 184/1.5, 105.1, 105.3, 184/106; 220/295, 304; 277/180, 212 F

[56] References Cited

U.S. PATENT DOCUMENTS

| | | | |
|---|---|---|---|
| 1,507,091 | 9/1924 | Runser | 220/304 |
| 1,634,655 | 7/1927 | Elstone | 220/304 |
| 2,769,566 | 11/1956 | Thompson | 220/304 |
| 3,843,015 | 10/1974 | Blau et al. | 220/304 |
| 3,893,487 | 7/1975 | Engelking | 220/304 |
| 4,951,783 | 8/1990 | Kamprath et al. | 184/1.5 |

Primary Examiner—Ira S. Lazarus
Assistant Examiner—Alan B. Cariaso
Attorney, Agent, or Firm—Lockwood Alex Fitzgibbon & Cummings

[57] ABSTRACT

A composite drain plug comprising a metal plug element and an elastomeric seal element. The plug element includes a body with a head portion defined in part by exterior, tool-engaging flank surfaces, a radially enlarged, seal positioning flange with an outer diameter surface and a seal-engaging end face surface. The plug also includes a threaded fastening shank, and a depth stop shoulder with a radial end face surface and an axial offsetting surface. The elastomeric seal element includes a seal body integrally bonded to the positioning flange and to offsetting shoulder surface on said depth stop. The seal body also includes a radially extending, axially inwardly directed end face primary sealing surface, lying axially inwardly of the end face of the depth stop.

11 Claims, 1 Drawing Sheet

COMPOSITE DRAIN PLUG

The present invention relates generally to automotiverelated specialty products, and more particularly, to a composite drain plug for use in the oil pan of an automotive engine, or for use in another application wherein a fluid is sealed within an enclosed area wherefrom it is desired to permit periodic draining and replenishment of fluid requiring plug removal.

When used as a drain plug for an automotive engine oil pan, the sealed unit of the invention comprises a plug body and a seal arrangement having a number of design features particularly adapted to solve persistent problems in the area of drain plug sealing.

By way of background, in automotive industry, literally millions of automotive engines are produced every year. Each of these engines is designed to operate for an extremely extended life, and according to current practice in the automotive industry, such engines are designed to operate with an absolute minimum of maintenance. At the current time, oil change intervals of 5,000 to 7,500 miles or more are not uncommon. In earlier times, oil change intervals of 1,000 to 2,000 miles were common. Accordingly, under earlier conditions, slight leakage from drain plugs was not a critical matter, inasmuch as fluid replenishment was both common and frequent.

Referring to another, more important problem, that of modern automotive design, for environmental reasons as well as for reasons of warranty coverage, virtually absolute reliability is becoming a requirement in the automotive industry. With the increased cost of automobile engines, and particularly in view of their incorporation into compact mechanisms which include front wheel drive assemblies and the like, replacement of an engine under warranty is not only highly expensive, but is also a highly labor-intensive operation. In this latter aspect, the trend to make modern mechanisms more compact in the interest of space and weight saving has further aggravated the trend toward rendering engines and their parts very inaccessible.

Accordingly, it is of the utmost importance that an engine or like sealed and lubricated component not fail by reason of a leaky drain plug. In the automotive industry, it was at one time common to use a steel-to-soft metal interface, usually in the form of a brass or copper washer, as a part of the drain plug sealing mechanism. However, with repeated use, such washer might be lost, scored or otherwise damaged, so such an approach has not been fully satisfactory. Cost and lack of reliability are also drawbacks to the approach of separate sealing elements.

For some time, synthetic resinous materials have been used as washers in sealed applications. While there are some advantages to this approach, new automotive engines achieve constantly higher operating temperatures, at least transiently, and obtaining suitable plastic materials for sealing engine parts is difficult.

Moreover, the practice of painting engine components as well as painting entire cars, now commonly involves processes wherein either the entire automobile or the components thereof are baked for curing purposes under considerable heat by infrared lamps or otherwise. Under these conditions, resinous materials used as a part of the sealing system have either been inadequate to withstand temperature, or more commonly, undergo cold flow and take a compression set, thus compromising the residual compressive force needed to maintain a seal.

Thus, a part which is initially sealed in a highly fluid-tight manner might lose its seal with the passage of time. Some such units may even lose substantial sealing effectiveness before leaving the place of manufacture.

Certain attempts have been made to provide elastomeric seals for these applications, but the use of separate elastomeric washers and the like has created problems with assembly, and also has created problems of controlling the degree of compressive force which is applied as the parts are fastened together during assembly. While insufficient forces create a risk of leakage, excessive forces have been known to damage the elastomeric or plastomeric component and thus create a risk of leakage in the short or long term.

Referring now to another aspect of modern manufacture and quality assurance, it is always been desired to place the responsibility for the effectiveness of any one mechanism, particularly parts that create a seal, with one manufacturer so that quality can be assured and so that responsibility can be properly located. Accordingly, manufacturers almost always wish to have mating parts made by the same manufacturer, if this can be done as a practical matter.

In view of the failure of the prior art to provide a completely satisfactory and economical oil pan sealing system, it is therefore an object of the present invention to provide such an improved product at low cost.

Another object of the invention is to provide a composite drain plug having an integral sealing element bonded thereto and adapted for highly reliable installation.

A still further object is to provide a drain plug which includes a specially shaped metal plug body and a elastomeric seal element integrally bonded to a portion of the plug body.

Yet another object of the invention is to provide a seal arrangement wherein dimensions of the components are arranged to ensure that mating metal parts are secured to each other in a manner acting as a definite depth or movement stop for the plug and in which the seal element is constructed so that the desirable residual compressive sealing force remains when there is metal-to-metal contact between the associated part and the depth stop.

A further object of the invention is to provide an integral drain plug and seal unit which may be manufactured reliably and at low cost.

Yet another object of the invention is to provide a composite elastomer and metal drain plug unit wherein the elastomeric component may be made from a variety of elastomers, including fluoroelastomers and other materials resistant to high temperature.

A still further object of the invention is to provide a composite drain plug unit which includes a plug body with a head portion, an integral, radially enlarged seal positioning flange with a flat end face surface, a depth stop shoulder having radially and axial surfaces, and with the plug further including a threaded shank portion, the plug having an elastomeric seal element integrally bonded to the radial, seal positioning flange and to a portion of the depth stop, with the elastomer also including an end face extending axially beyond the end face of the depth stop by a distance sufficient to ensure application of a controlled compressive force on the elastomer.

The foregoing and other objects and advantages of the invention are achieved in practice by providing a composite drain plug having a plug element with a threaded shank portion, a body portion which includes a depth stop defined by axially and radially facing should surfaces, an integral flange having radially and axially directed surfaces and a head with plural, tool-engaging flank surfaces, with the composite plug further including an elastomeric element integrally bonded to one surface of the depth stop and to both axial and radial surfaces of the flange unit, with the elastomeric seal also including an end face sealing surface extending beyond of the plane of the depth stop end face in the direction of the shank, to determine the degree of elastomer compression when the plug is fully installed.

The exact manner in which the foregoing and other objects and advantages are achieved in practice will become more fully apparent when reference in made to the following detailed description of the preferred embodiment of the invention set forth by way of example and shown in the accompanying drawings, wherein like reference numbers indicate corresponding parts throughout.

DESCRIPTION OF THE PREFERRED EMBODIMENTS OF THE INVENTION

Figure 1:
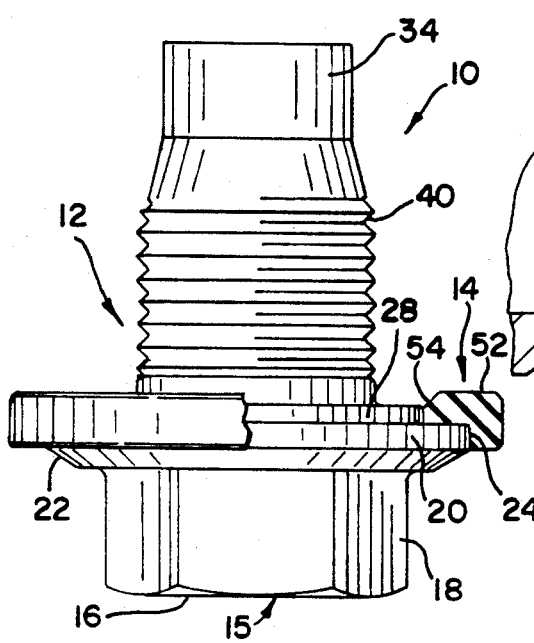
FIG. 1 is a side elevational view, with portions broken away, showing the composite drain plug of the present invention.

While the drain plug unit of the invention may be embodied in different forms, a detailed description thereof will be made wherein the plug body is made from metal, the seal component is made from an elastomer that is resistant to high temperatures and wherein the application is the oil pan of an automotive engine.

Referring now to the drawings in greater detail, a composite drain plug unit generally designated 10 is shown to include two major elements, a plug body generally designated 12, and an elastomeric seal element generally designated generally designated 15 and.

As is further illustrated in the figures, the plug body 12 includes a head portion 14 having a top surface 16 plural, exterior, tool-engaging flank surfaces 18 terminating at their lower ends in a radially enlarged seal positioning flange 20. While the plug 10 is shown with its head a the bottom and its nose extending upwardly, the terminology used herein assumes that, for conventional reasons, the head is the "top" or "upper" end of the plug. The term "inner" in the axial sense means toward the nose or tip of the plug, which is toward the interior of the sealed region.

Figure 3A:
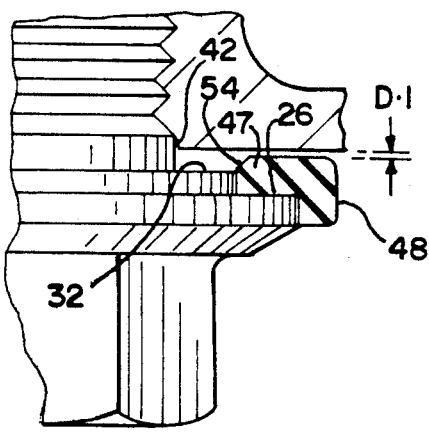
FIG. 3a is a fragmentary view, partly diagrammatic in nature, showing the composite drain plug in relation to the oil pan just prior to engagement between the seal element of the plug and an end face of the pan.
Figure 3B:
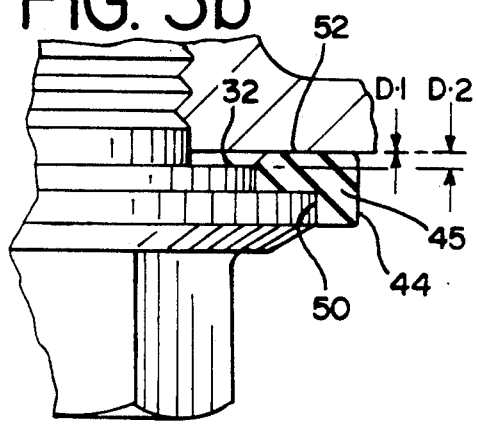
FIG. 3b is a view similar to FIG. 3A, but showing initial contact between the seal end face and a portion of the oil pan.
Figure 3C:
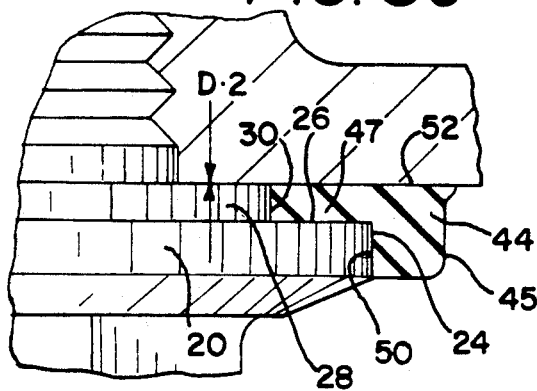
FIG. 3c is a view similar to FIGS. 3A and B, showing the plug and the pan in a fully assembled and seated relation with the depth stop engaging the pan wall.

As is also shown, the flange 20 includes a beveled, axially outer surface 22, a generally axially extending, seal bonding surface 24 and a radially extending, flat, end face surface 26 (FIG. 3C).

Another portion of the body 12 includes a depth stop unit 28, the depth stop being in the form of a shoulder having an axially extending annular surface 30 and an annular end face surface 32 of reduced diameter relative to face surface 26 of the flange 20 (FIGS. 3a–3c).

As is shown in FIG. 1, the axial surface 30 of the depth stop 28 and the axial end face surfaces 24, 26 of the depth stop 28 serve as a bonding surfaces for the elastomeric seal to be described.

Additional portions of the plug body include a reduced diameter nose 34 serving as a pilot diameter portion for entry into the opening in the intended application, a tapered or beveled surface 36 and a shank 38 (FIG. 2) having plural exterior threads 40. In the form shown, a circumferential, thread-free surface 42 is shown to extend axially a short distance from the inner margin of the depth stop end face 32.

Referring now to the elastomer element 14, it will be noted that this is a one-piece molded element of annular construction, having a generally L-shaped cross-section. The elastomer body 44 includes an outer circumferential wall surface 48 of generally cylindrical configuration, an inner bonding surface 50 which is secured to the surface 24 of the seal positioning flange 20, an axially directed, radially extending seal end face surface 52 extending inwardly from the cylindrical surface 48 and terminating in a tapered or beveled surface 54 the inner margin of which terminates at the shoulder formed by the junction of surfaces 30, 32 defining the depth stop unit 28.

Figure 2:
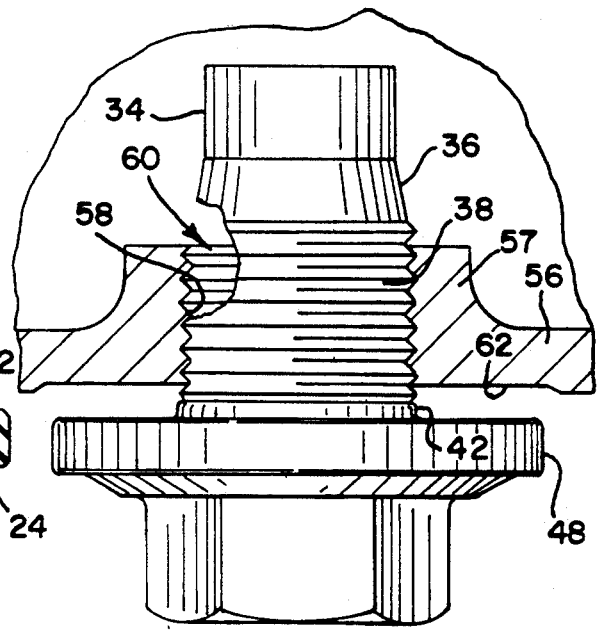
FIG. 2 is a side elevational view, with portions in section, showing the drain plug of the invention in relation to an associated vehicle engine oil pan, and showing the plug unit in an intermediate stage of installation.

Referring now to FIG. 2, there is also shown in the drawings a typical mating part with which the composite plug 10 is normally associated in use. Here, a bottom wall portion 56 of an engine oil pan (not shown in detail) is illustrated as including an inwardly extending area of increased thickness or boss 57 having a threaded inner surface 58 defining an opening generally designated 60 for receiving the fastening threads 40 on the plug body 12. In the form shown, the boss 57 is integrally formed with the bottom wall portion 56 of the oil pan, since the pan is made from cast aluminum or like material. FIG. 2 shows that the outer surface 61 of the pan includes a finished or milled end face portion 62 adapted for a snug fluid-tight relation with the end face 52 of the elastomeric seal element.

As shown in FIG. 2, beginning a normal installation involves simply inserting the reduced diameter pilot end 34 of the fastener within the opening 60, achieving mutual engagement between the threads 58 on the tapped sidewall surface 56 and the threads 40 on the plug shank 38. Thereupon, continued rotation of the plug advances it until the plug is fully seated. This is determined by solid engagement between the end face 32 of the depth stop 28 and an inner margin of the end face 62 on the pa wall 56. This creates a very reliable seal action, as will be described.

As shown in FIG. 3a, just prior to initial engagement, there is a distance D-1 between the seal element end face 52 and the oil pan end face surface 62. Additional rotation of a fraction of a turn causes initial face-to-face engagement of these parts, as shown in FIG. 3b; however, there is still an axial space D-2 between the seal end face 62 and the depth stop end face 32. From this point, continued rotation causes controlled deformation of the seal element body 44 to achieve a proper seal.

In this connection, as shown in FIG. 3c, the outer wall 48 of the seal body 44 shears slightly away from its relaxed or as-molded position on the flange 20, while the portion 47 of the elastomeric body 44 lying between the flange end face 26 and the seal body contact face 52 is subject to deformation in compression.

Inasmuch as elastomers are essentially non-compressible when confined, this action of applying an end load will occasion a slight bulging of the area 54 forming the inner margin of the elastomeric body 44 at the same time the outer body 44 bulges and shears. As illustrated in FIG. 3b, some of this deformation starts to occur prior to complete seating of the plug, but continued rotation of the plug essentially flattens the bulge 54 completely and deforms the outer body as described above and as shown in FIG. 3c. A large increase in resistance to rotation is created by initial and continuing engagement between the elastomeric body 44 and the face 62 of the oil pan wall 56, especially where the elastomer is trapped between those face and is thereby subjected to compressive load. The exact creation and resolution of these forces depends on the dimension of the parts, but in keeping with the properties of the materials in question, the wider the flange 26 and the thinner the section 47, the more rapidly compressive forces will rise in proportion to a given amount of axial plug movement. Naturally, the overall thickness of the elastomeric body and the relative size of the space or distance D-2 in relation to the thickness of the confined body section 47 affects the overall sealing action.

A controlled, positive stop to the increasing compressive loading is achieved as is also illustrated in FIG. 3c, when the end face 32 of the depth stop abuts the faced-off margin 62 of the oil pan to provide metal-to-metal contact. This positive stop arrangement, in use, generates a sudden further increase in torque, such that the rachet mechanism in the impact wrench or like power tool customarily used to make the assembly is triggered and no further plug movement occurs. The torque specification, wrench setting and plug element design are harmonized so proper values can be realized. When this is done, a reliable and leakproof seal is created, as well as a seal that can be repeatedly established reliably.

Figure 4:
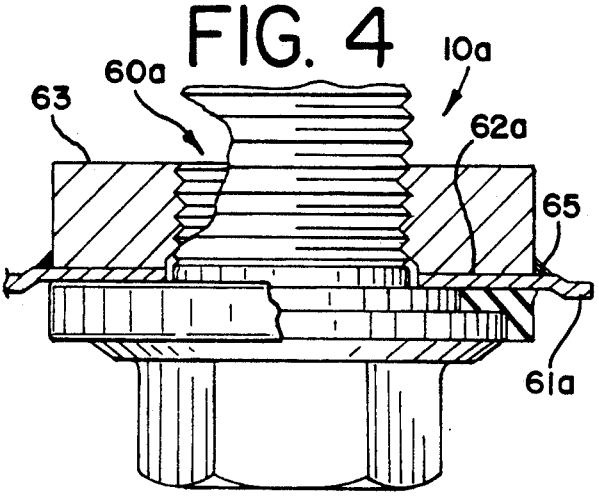
FIG. 4 is a view of the plug of the invention used in a modified form of oil pan.

Referring now to FIG. 4, another variation of the invention is shown. Here, the plug 10a is of the same construction as its counterpart in FIGS. 1-3c. In the embodiment of FIG. 4, the application is slightly different in that the oil pan wall 61 is made from a drawn or stamped sheet metal material, and the end face 62a of the pan wall is formed by stamping, coining or grinding. The threads 58a defining the opening 60a are formed in a captive nut 63 which is affixed to the wall 61a by a welding or brazing deposit 65. In other aspects, the application is the same.

Referring now to preferred dimensions, the D-2 thickness identified above should be less than the axial dimension of the depth stop wall 30. In one preferred form, this dimension D-2 is about one-half or less than one-half of the depth of the wall 30. As the radial extent of the end face surface 26 becomes greater, the stiffer the elastomeric confined section 47 becomes, and consequently, the face 26 should be equal to or larger than the depth of the wall 30.

Typically, the elastomeric seal element 14 is made from a synthetic elastomer such as a nitrile elastomer or the like. However, in certain instances, an elastomer of a different composition may be selected for even higher temperature resistance, and to resist compression set over a period of time, especially in a comparatively high temperature atmosphere. Such compositions may comprise filled or unfilled fluoroelastomers, modified nitriles, or other suitable compositions. Because, as will appear, the elastomeric seal component undergoes relatively high shearing forces upon installation, an important characteristic of the elastomer is that it have relatively great stiffness in compression and substantial shear resistance. Those skilled in the art are aware of elastomers which are suitable for such purpose, including those specifically referred to above.

It will thus be seen that the present invention provides an improved composite drain plug for an oil pan assembly. Preferred forms of the invention having been described by way of example, it is anticipated that modifications and changes to the described form of apparatus will occur to those skilled in the art, and it is anticipated that such changes may be made without departing from the spirit of the invention or the scope of the appended claims.

I claim:

1. A composite drain plug for use with a vehicular oil pan having a pan wall including means for receiving a threaded fastener secured with a high force, with said pan wall including an annular, outwardly directed end face surface for fluid-tight sealing with said associated composite drain plug, said composite drain plug comprising, in combination, a metal plug element and an elastomeric seal element, said plug element including a body with a head portion defined in part by exterior, tool-engaging flank surfaces, a radially enlarged, seal positioning flange, said flange including an outer diameter surface and a seal-engaging end face surface, a depth stop shoulder having radial end face surface and an axial offsetting surface, and a threaded fastening shank, said elastomeric seal element including a seal body integrally bonded to said positioning flange and to said offsetting shoulder surface on said depth stop, said seal body also including a radially extending, axially inwardly directed seal body end face, said primary seal body end face providing a sealing surface lying axially inwardly of said depth stop end face, whereby, upon installation, said seal body end face will contact a portion of said pan wall in snug sealing engagement, and whereby, upon engagement between said depth stop end face and said pan wall, said seal body will be compressed between said flange end face and said pan wall to a predetermined degree.

2. A composite drain plug as defined in claim 1 wherein said plug body further includes a reduced diameter, inner guide tip portion extending from the end of said threaded shank lying opposite said head portion of said plug.

3. A composite drain plug as defined in claim 1 wherein said elastomeric seal element is made from an elastomer which is resistant to high temperature.

4. A composite drain plug as defined in claim 1 wherein said elastomeric seal element is made from a fluoroelastomer material.

5. A composite drain plug as defined in claim 1 wherein the axial dimension between said seal body end face in the uninstalled condition and said end face of said depth stop is less than the axial extent of said offsetting shoulder surface on said depth stop.

6. A composite drain plug as defined in claim 1 wherein the axial dimension between said seal body end face in the uninstalled condition and said end face of said depth stop is less than about one-half the axial extent of said offsetting shoulder surface on said depth step.

7. A composite drain plug as defined in claim 1 wherein said axial offsetting surface is at least one-third as long as the radial extent of said end face surface on said seal positioning flange.

8. In combination, a vehicle oil pan and a composite drain plug for said oil pan, said oil pan including a bottom wall with an opening therein, said opening being defined by a threaded sidewall, said composite drain plug comprising, in combination, a metal plug element and an elastomeric seal element, said plug element including a body with a head portion defined in part by exterior, tool-engaging, flank surfaces, a radially enlarged, seal positioning flange, said flange including an outer diameter surface and a seal-engaging end face surface, a depth stop shoulder having radial end face surface and an axial offsetting surface, and a threaded fastening shank, said elastomeric seal element including a seal body integrally bonded to said positioning flange and to said offsetting shoulder surface on said depth stop, said seal body also including a radially extending, axially inwardly directed seal body end face said primary seal body end face providing a sealing surface lying axially inwardly of said depth stop end face, said seal body end face in the installed portion of said plug contacting a portion of said pan bottom wall in snug sealing engagement, said seal body thereby compressed into a fluid tight seal by engagement between said flange end face and said pan wall.

9. A combination drain plug as defined in claim 8 wherein said plug body further includes a reduced diameter, inner guide tip portion extending from the end of said threaded shank lying opposite said head portion of said plug.

10. A combination drain plug as defined in claim 8 wherein said elastomeric seal element is made from an elastomer which is resistant to high temperatures.

11. A composite drain plug as defined in claim 8 wherein said elastomeric seal element is made from a fluoroelastomer material.

* * * * *